April 4, 1939.  H. B. KLINE  2,153,376

FILM PROCESSING APPARATUS

Filed Nov. 1, 1937   3 Sheets-Sheet 1

Inventor
HAYDEN B. KLINE

Attorney

April 4, 1939. H. B. KLINE 2,153,376
FILM PROCESSING APPARATUS
Filed Nov. 1, 1937 3 Sheets-Sheet 2
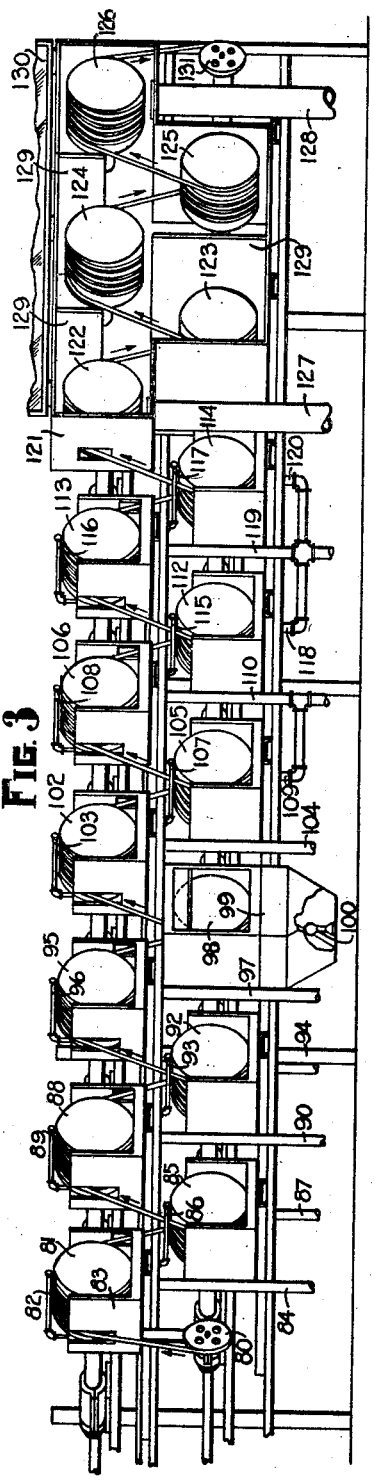
Inventor
HAYDEN B. KLINE
Charles E. Pierrestron
Attorney April 4, 1939.     H. B. KLINE     2,153,376
FILM PROCESSING APPARATUS
Filed Nov. 1, 1937     3 Sheets-Sheet 3
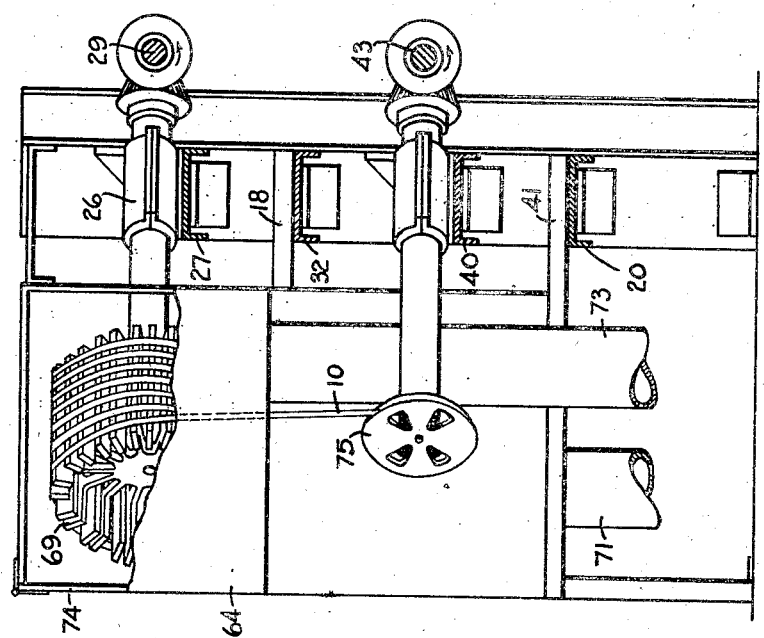
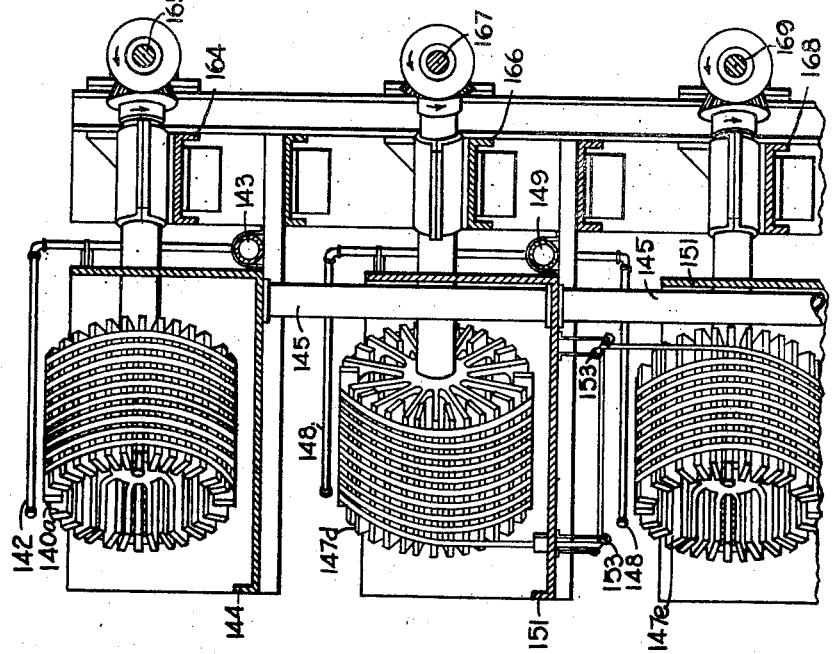
Inventor
HAYDEN B. KLINE
Attorney Patented Apr. 4, 1939

2,153,376

UNITED STATES PATENT OFFICE 2,153,376

FILM PROCESSING APPARATUS

Hayden B. Kline, Cleveland, Ohio, assignor to Industrial Rayon Corporation, Cleveland, Ohio, a corporation of Delaware Application November 1, 1937, Serial No. 172,140

8 Claims. (Cl. 271—2.3)

This invention relates to apparatus for the continuous processing of motion picture film.

Heretofore, the processing of motion picture film has been difficult because of the long lengths of film which must be handled. Attempts to cut the film into short lengths capable of being handled as units in small tanks have not been satisfactory because the different lengths are inevitably processed under different conditions. Efforts at processing the film while in continuous motion have not been successful because of inherent defects in the apparatus employed, such as a tendency to place an uneven tension upon the film. Inasmuch as motion picture film when wet is highly fragile and may be scratched easily, such prior apparatus often has caused damage to the film.

In the apparatus of the present invention, the motion picture film is handled upon devices which do not subject it to excessive stress and as a result film breakage is minimized. Furthermore, due to the construction and arrangement of the film-handling devices of the present invention, the emulsion is at all times protected from contact with the machine so that scratching of the emulsion is made impossible. Other advantages of the invention will in part be obvious and will in part be pointed out hereinafter as the description of the invention proceeds.

Figure 1:
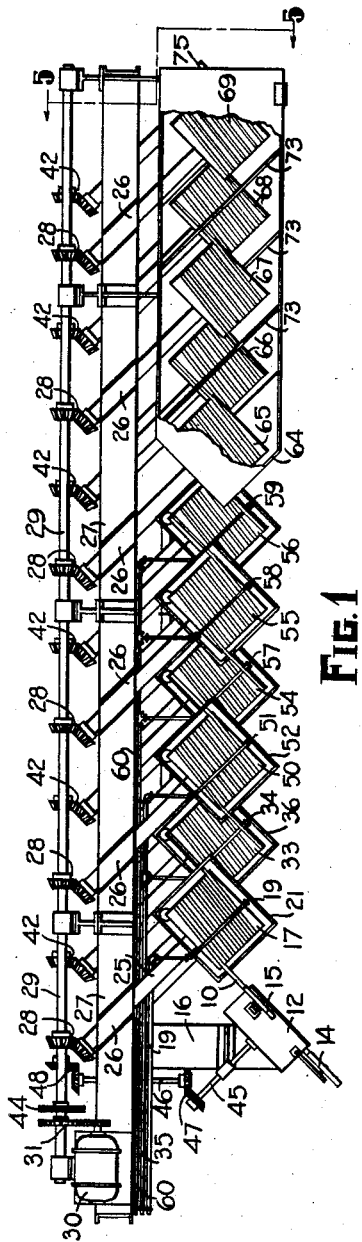
Figure 2:
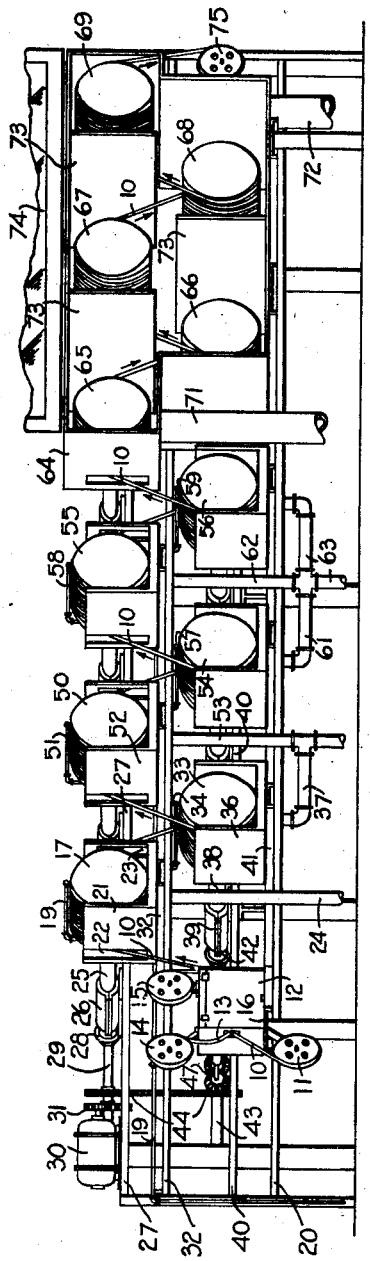

In the accompanying drawings, illustrating several embodiments of the invention, Figure 1 is a plan showing the film processing apparatus of the present invention as employed in conjunction with a motion picture printing device. Figure 2 is a front elevation of the apparatus of Figure 1. Figure 3 is a front elevation of apparatus constructed in accordance with the invention for the processing of film by the reversal method. Figure 4 is a front elevation of apparatus for processing motion picture film at a high rate of speed. Figure 5 is a section on the line 5—5 of Figure 1. Figure 6 is a section on the line 6—6 of Figure 4.

Referring first to Figures 1, 2 and 5, the positive film 10 to be printed and processed is contained upon a spool 11 carried by the printing device 12, the film being so wound on spool 11 that the emulsion side thereof is outside. The negative film 13 is contained upon a spool 14 and, after passing through the printing device 12, is collected upon spool 15. During the passage of the negative and positive films through the printing device 12, the positive film is exposed through the negative film to a light source (not shown) in such manner that a latent image is formed on the positive film 10. The printing device 12 is carried on an arm 16 which projects from a channel 20 extending lengthwise of the machine as a whole.

From printing device 12, the positive film 10 travels to an obliquely disposed reel 17 upon which it is subjected to a developing treatment.

The reel here shown operates on the same general principle as the reel disclosed in British Patent No. 413,414, which corresponds to a domestic application of Walter F. Knebusch, Serial No. 652,089, filed January 16, 1933, for "Winding reel". Broadly speaking, such a reel consists of two interdigitating sets of rigidly mounted bar members the axes of which are disposed in offset and inclined relation. Preferably, the axis of the one set of bar members lies within the periphery of the other set of bar members so that the bar members alternate and the device as a whole is of unitary construction. Due to the offset and inclined relation of the sets of bar members, the film is advanced along the reel in a series of closely spaced, generally helical turns.

Developing fluid is delivered from any suitable source to reel 17 through distributor 19 and is discharged along the reel by openings formed in the portion of the distributor immediately above the reel. To collect the developing fluid as it runs off the reel 17, a casing 21 is provided partly surrounding the reel, such casing being carried upon arm 18 projecting from channel 32 extending lengthwise of the machine. Casing 21 is provided with a vertical slot 22 for the passage of the film to the reel 17 and a vertical slot 23 for the passage of the film from the reel. Fluid collected in the bottom of the casing 21 may be delivered through pipe 24 to a collecting tank for possible re-use or, if desired, may be discarded.

It is preferable that the reel 17 be supported only toward the rear thereof so that the front end may be free for easy access to the reel. This facilitates inspection of the reel during operation thereof as, for example, to determine whether it is functioning properly; also, it facilitates any necessary manipulation of the film upon the reel. For example, in initially threading up the reel or in threading it up after breakage of the film, access to the unsupported end of the reel enables the operator to wind the film about the reel in the helical conformation which the film assumes during normal operation of the reel. The reel 17 is preferably so rotated that the film is advanced toward the unsupported end thereof.

The projecting shaft which drives reel 17 is housed within a bearing 25 which is secured by clamp 26 to a channel 27 extending longitudinally of the machine as a whole. The shaft for reel 17 is driven through gears 28 from a line shaft 29 extending lengthwise of the machine. Shaft 29 is driven by motor 30 through reduction gears 31. As clearly appears from Figures 1, 2 and 5 of the drawings, the reel 17, which by virtue of the fact that it is supported from one end only may be said to be of cantilever construction, extends substantially horizontally in the general direction of the operating face of the machine.

After development upon reel 17, the positive film 10 is passed to reel 33, upon which it is subjected to treatment by a photographic fixing fluid. The fixing fluid is distributed along reel 33 from openings in distributor 34, which is connected to a supply conduit 35. Partially surrounding reel 33 is a casing 36 which collects the fixing fluid and delivers it to discharge pipe 37. Casing 36 may be mounted upon an arm 41 projecting obliquely from the channel 20. As shown in Figures 1 and 2, reel 33 is parallel to reel 17.

The bearing 38 for the shaft of reel 33 is secured by clamp 39 to a channel 40 extending lengthwise of the machine. To drive the shaft for reel 33, it is connected through gears 42 to a line shaft 43 carried by the frame of the apparatus, preferably directly below shaft 29. Line shaft 43 may be driven from line shaft 29 through sprocket and chain connection 44. In order that reel 33 may be driven at the same angular speed as reel 17, it is desirable that shaft 43 be rotated at the same angular speed as shaft 29.

The printing device 12 may conveniently be driven from line shaft 43, the connection being established through intermediate shaft 46. Gears 47 connect the shafts 45 and 46 together, while gears 48 connect shafts 43 and 46 together. Since the printing device 12 and reels 17 and 33 are connected together in this manner and receive their motive power from the common motor 30, they handle the film at a predetermined constant speed. By handling the film at a substantially constant speed, any unintentional stretching of the film between successive reels may be largely avoided.

From reel 33 the positive film 10 passes to reel 50. Distributor 51, which is above reel 50, is connected to conduit 35, so that additional fixing fluid may be delivered to reel 50. The fixing fluid, after leaving reel 50, is collected in casing 52 from which it is conducted by a pipe 53 communicating with pipe 37. Reel 50 is supported upon channel 27 and is driven from line shaft 29. Casing 52 is supported from channel 32 similarly to casing 21. The use of reel 50 to subject the film to a further fixing treatment is desirable in view of the additional time which is required to fix the film as compared with the time required for the development of the film.

From reel 50 the positive film 10 passes successively over reels 54, 55 and 56. Reels 54 and 56 are carried upon longitudinal channel 40 and are driven from line shaft 43. Reel 55 is carried upon channel 27 and is driven from line shaft 29. Upon the reels 54, 55 and 56, the film is subjected to a washing treatment by clear water showered from distributors 57, 58 and 59, which, as shown, are connected to a common conduit 60. Pipes 61, 62 and 63 leading from the separate casings for the reels are joined and serve to conduct the contaminated water from the reels. The use of three reels to wash the film is desirable to insure complete washing of the film and removal of all of the soluble salts which tend to remain upon the film after the fixing treatment.

After leaving reel 56, the positive film 10 enters drying chamber 64 in which are disposed a plurality of reels 65, 66, 67, 68, and 69. Reels 65, 67 and 69 are carried upon channel 27 and are driven from shaft 29, whereas reels 66 and 68 are carried upon channel 40 and are driven from shaft 43. Heated air or other drying medium is supplied to the drying chamber 64 through conduit 71 and leaves the chamber through conduit 72. To direct the passage of the drying medium through the drying chamber in such manner that it comes in more complete contact with the reels, partitions 73 are provided. A hinged glass closure 74 makes it possible completely to enclose the several drying reels.

From the drying chamber the positive film 10 passes to and is collected upon a take-up spool 75. The bearing for spool 75 is supported upon channel 40 and is driven from shaft 43. It is desirable that a suitable slip coupling of conventional type (not shown) be located between spool 75 and its drive shaft so that the spool 75 will be allowed to rotate at a progressively lower speed as the thread accumulates thereon. If desired, however, the angular speed of spool 75 may be progressively reduced by a variable transmission so as to compensate for its progressively increasing diameter.

In passing through the machine, the positive film 10 changes slightly in length. During its passage over reels 17, 33, 50, 54, 55 and 56, upon which the film is subject to liquid processing treatments of various kinds, the film progressively increases in length due to the absorption of water, such increase in length amounting in all to approximately 4%. In passing through the drying chamber, the film shrinks by about the same amount, so that when collected upon reel 75 it has approximately its initial length.

To compensate for this increase in length of the film as it passes over the several reels on which liquid is applied to the film, these reels may be flared so that they increase in diameter toward their unsupported ends, the receiving end of each reel having approximately the same diameter as the discharge portion of the preceding reel. The drying reels should be tapered to decrease in diameter toward their unsupported ends so as to compensate for shrinkage of the film in the drying operation. The receiving end of each reel should, however, have the same diameter as the delivery end of the preceding reel.

It is preferable to compensate for the increase and decrease in the length of the film during its passage through the machine by modifying the shape of the reels in the manner above described. The same object may, however, be accomplished by utilizing reels of a uniform diameter which are rotated at progressively faster or slower speeds, as required for the particular reel. Inasmuch as the amount of increase or decrease in length upon each reel is relatively slight, the film may advance properly over each reel even though it is of approximately cylindrical shape, the change in length of the film being compensated for between successive reels.

In first putting the apparatus into use, a leader strip is first threaded through the entire apparatus, this being most conveniently done with the machine at rest.

When it is desired to print and process motion picture film, spool 14 of the desired negative is placed upon the printing device 12 in contact with the positive film 10 from spool 11, the leading end of the positive film 10 being secured to the end of the leader strip upon reel 17. The several processing liquids and the drying medium may then be supplied to the apparatus and motor 30 started in operation. The positive film is progressively printed, developed, fixed, washed and dried during the passage through the apparatus and, upon leaving reel 69, is severed from the leader strip and secured to take-up spool 75.

After the negative has been fully printed, the leader strip originally used may be secured to the positive film 10 at the end thereof upon which printing was last performed, the apparatus being stopped when the leader strip appears at take-up spool 75. In this manner the apparatus will have threaded throughout its entire length a leader strip in readiness for subsequent use of the apparatus. If, however, continuous use of the apparatus is contemplated, the negative which is next to be printed may be secured thereto and the new spool of negative film may be placed upon the printing device. In like manner, it is possible to attach the leading end of a new spool of positive film to the terminal end of the preceding film and to place the new spool of film upon the printing device, the separate positive films being collected upon different spools 75.

The illustrated arrangement of reels is advantageous in that the machine is shortened and the film passes from one reel to another without the employment of guiding means.

In general, the axes of the reels are disposed in two parallel planes, the successive reels to which the film passes being disposed alternately. The reels located in either one of the two rows so formed lie substantially midway between the adjacent reels of the other row. Because of this relationship and due to the disposition of the reels at an angle to the supporting frame of the apparatus, the discharge portion of each reel is in juxtaposition to the receiving portion of the next succeeding reel. Since the film may pass directly from one reel to the following reel without being turned, it is not necessary to employ any guiding means, for which reason damage to the film emulsion, which is always on the side of the film out of contact with the reels, is wholly obviated.

This general arrangement is followed in the apparatus of Figure 3, in which is illustrated a machine adapted to perform a reversal process upon motion picture film. In this apparatus, the exposed motion picture film is contained upon spool 80. From spool 80 the exposed film passes to a reel 81 which is similar to the reels employed in the apparatus illustrated in Figures 1, 2 and 5. Developing fluid is supplied to reel 81 through openings in distributor 82. Used developing fluid is collected by casing 83, from which it is discharged through pipe 84.

Upon reel 85, to which the exposed film next passes, it is subjected to the action of a washing fluid delivered through distributor 86. The washing treatment serves to remove all of the soluble silver salts from the film. Inasmuch as the time required to remove such salts is approximately the same as that required for the development of the film, a single reel 85 ordinarily is adequate for washing purposes. The spent washing fluid collected in the casing surrounding the reel 85 is carried off by means of pipe 87.

The exposed film is next delivered to reel 88, upon which it is subjected to the action of a bleaching solution delivered from distributor 89.

From reel 88, the film passes to reel 92 upon which it receives a clearing bath delivered from distributor 93. The film is next washed upon reel 95, to which washing fluid is delivered through distributor 96. The spent processing media used upon these several reels are removed by pipes 90, 94 and 97, respectively.

From reel 95 the film passes to reel 98 to receive its second or "flash" exposure. Reel 98 is surrounded by a container 99 which fully encloses the reel with the exception of the openings for the ingress and egress of the film. The lower portion of the container extends downward to provide room for an electric light or other source of illumination 100. It is desirable that the light 100 be located a moderate distance away from the reel in order that more nearly uniform illumination of the reel as a whole may be had. The intensity of the light may be varied as in known practice in accordance with the printing characteristics of the film being handled upon the reel 98.

Upon reel 102, to which the exposed film next passes, the film is subjected to a developing fluid supplied through distributor 103 and carried off by pipe 104. The film then passes successively to reels 105 and 106, upon each of which a fixing solution supplied through distributors 107 and 108 is showered upon the film. Discharge pipes 109 and 110 are joined for delivery of the spent fixing solution. In view of the necessity of washing the film, it is next passed successively over reels 112, 113 and 114, respectively receiving washing fluid from pipes 115, 116 and 117 and discharging it through discharge pipes 118, 119 and 120.

After the washing treatment, the film passes into drying chamber 121 within which are located reels 122, 123, 124, 125 and 126. To dry the film during its passage over such reels, a heating medium such as hot air is supplied to the chamber by conduit 127 and removed therefrom through conduit 128 at the other end thereof. To insure contact of the drying medium with all of the reels in the drying chamber, baffles 129 are located between the several reels. A closure member 130 hinged to the chamber 121 toward the top thereof is provided to close the front of the chamber.

Inasmuch as the film upon issuing from the drying chamber 121 is completely dried and ready for use, it is preferably collected immediately upon a spool 131. If the apparatus is being employed continuously, as soon as spool 80 is emptied the leading end of a second spool is fastened to the terminal end of the film first passed through the apparatus, the new spool replacing spool 80. In like manner, the spool 131 may be replaced by a new collecting spool for the second film as soon as the film first passed through the apparatus is completely collected upon the first spool 131.

Since the supports for the several reels and casings illustrated in the apparatus of Figure 3 are similar to those employed in the apparatus illustrated in Figures 1, 2 and 5, the supports need not be described in detail. The means for rotating the several reels and the spool 131 are similar to those illustrated in Figures 1, 2 and 5. As in the apparatus of Figures 1, 2 and 5, the arrangement of the reels in the machine of Figure 3 is in two parallel rows, a given reel in one row being located midway between two reels in the other row. Because of the large number of reels required to carry out the reversal method of processing moving picture film, this disposition of the reels results in a short overall length of the apparatus.

To compensate for the increase and subsequent decrease in the length of the film the reels may be flared or tapered, as required, or they may be rotated at different rates of speed as described in connection with Figures 1, 2 and 5.

Commercial practice frequently requires that the film be processed at a relatively high rate of speed. This is especially true of negative film, the handling of which is not delayed by the time required for printing. Accordingly, it is possible in the processing of negative film to handle the film as rapidly as the limitations of the equipment will permit. The apparatus disclosed in Figures 4 and 6 illustrates an arrangement which will treat the film as rapidly as desired.

In this apparatus, an increased number of reels over that illustrated in Figures 1, 2 and 5 is provided for each individual processing step. For development, film from the spool 141 is first passed successively over the four reels 140a, 140b, 140c and 140d. Developing fluid is showered upon the reels 140a, 140b, 140c and 140d from the several distributors 142 connected to a common conduit 143. To collect the spent developing fluid, the reels are partially enclosed by a casing 144 to which is connected a waste pipe 145.

From the last of the reels 140d, the film passes successively over eight reels 147a, b, c, d, e, f, g, and h to which a suitable fixing liquid is supplied by distributors 148 connected to a supply conduit 149 and from which it is removed by waste pipe 150 communicating with upper and lower casings 151.

In passing from the last developing reel 140d to the first fixing reel 147a, the film travels downward in a straight line due to the location of the receiving portion of fixing reel 147a directly below the discharge portion of developing reel 140d. In proceeding from the fourth fixing reel 147d to the fifth fixing reel 147e, the film is guided by rollers 153. These rollers conduct the film to the rear from a point directly below the discharge portion of reel 147d to a point directly above the receiving portion of the reel 147e. It is important that the rollers 153 be so disposed as to protect the emulsion side of the film from contact with the rollers.

From the last fixing reel 147h, the film passes to the twelve wash reels 154a, b, c, d, e, f, g, h, i, j, k and l. Washing fluid is supplied to these reels through distributors 155 connected to conduit 156. The washing fluid, after leaving each reel, is carried off by a common conduit 157. In passing from wash reel 154d to wash reel 154e, rollers 153 are necessary to guide the film. However, in passing from wash reel 154h to wash reel 154i, the film may make a direct passage from one reel to the other.

After leaving the last wash reel, the film enters drying chamber 158 in which are contained eighteen drying reels 159a to 159r, inclusive. In the arrangement shown, there are six such reels in each of the three rows. Hot air or other drying medium is supplied to the drying chamber through conduit 160 and is removed from the drying chamber through conduit 161. In passing from drying reel 159f to drying reel 159g, no guide means are required since the film may make a direct passage. Guide rollers 153 are, however, required to conduct the film from drying reel 159l to drying reel 159m.

For collecting the dried film, spool 162 is provided immediately outside the drying chamber.

The several reels disposed in the uppermost row are supported upon a longitudinally extending channel member 164, these reels being driven from line shaft 165. The intermediate row of reels is supported upon channel member 166; these reels are driven from line shaft 167. The lowermost row of reels is carried upon channel 168 and is driven from line shaft 169. All reels in the same row are inclined in the same direction, the reels in the intermediate row slanting in a direction opposite to that of the reels in the uppermost and lowermost rows.

Because of the large number of reels provided for the performance of each processing step, the film may pass through the apparatus at a relatively high rate. For example, if the reels illustrated in Figures 4 and 6 are of the same size as the reels illustrated in Figures 1, 2 and 5, the apparatus of Figures 4 and 6 may handle the film four times as fast as the apparatus in Figures 1, 2 and 5. It is possible to obtain a still greater increase in the rate of handling by further increasing the number of reels upon which each of the several processing steps is performed. It is only necessary that the relative number of reels for each processing step be present in substantially the ratio illustrated in Figures 4 and 6.

The invention contemplates that departures may be made from the arrangements illustrated in the drawings. For example, a feature illustrated in one embodiment of the invention may be incorporated in or substituted for a corresponding feature of one of the other embodiments.

For instance, instead of reversing film in an apparatus similar to that illustrated in Figure 3, it is possible to arrange the reels in the manner illustrated in Figures 4 and 6 and to increase their number so that the reversing process may be carried on at an increased speed. Although the film processing steps herein disclosed are the ones necessary for the development and fixation of a silver image in a film, the several forms of apparatus disclosed, or suitable modifications of them, may be utilized to carry out the usual processes for the formation of color images in a film: Instead of the developing solution ordinarily employed, a coupler-developer may be utilized to produce a color image.

It is intended that the patent shall cover, by suitable expression in the appended claims, whatever features of patentable novelty reside in the invention.

What is claimed is:

1. Apparatus for handling photographic film during processing comprising a concatenate series of unitary helix-forming devices rotated in the same angular direction on each of which, in response to rotation of the helix-forming device, the film is automatically advanced in an otherwise unguided helical path the pitch of which is sufficient in and of itself to prevent the overlapping of adjacent turns of film, alternate ones of the several helix-forming devices going to make up such series being disposed with their axes in the same horizontal plane.

2. Apparatus for handling photographic film during processing comprising a concatenate series of unitary helix-forming devices on each of which, in response to rotation of the helix-forming device, the film is automatically advanced in an otherwise unguided helical path the pitch of which is sufficient in and of itself to prevent the overlapping of adjacent turns of film, the film passing tangentially from the film-discharging end of each of the several helix-forming devices going to make up such series to the film-receiving end of the succeeding helix-forming device.

3. Apparatus for handling photographic film during processing comprising a concatenate series of unitary helix-forming devices rotated in the same angular direction on each of which, in response to rotation of the helix-forming device, the film is automatically advanced in an otherwise unguided helical path the pitch of which is sufficient in and of itself to prevent the overlapping of adjacent turns of film, the film-discharging end of each of the several helix-forming devices going to make up such series being in apposition to the film-receiving end of the succeeding helix-forming device.

4. Apparatus for handling photographic film during processing comprising a concatenate series of unitary helix-forming devices on each of which, in response to rotation of the helix-forming device, the film is automatically advanced in an otherwise unguided helical path the pitch of which is sufficient in and of itself to prevent the overlapping of adjacent turns of film, the several helix-forming devices going to make up such series being disposed with their axes parallel to each other.

5. Apparatus for handling photographic film during processing comprising a concatenate series of unitary helix-forming devices rotated in the same angular direction on each of which, in response to rotation of the helix-forming device, the film is automatically advanced in an otherwise unguided helical path the pitch of which is sufficient in and of itself to prevent the overlapping of adjacent turns of film, the film following a staggered course in progressing through the various helix-forming devices going to make up such series.

6. Apparatus for handling photographic film during processing comprising a concatenate series of unitary helix-forming devices on each of which, in response to rotation of the helix-forming device, the film is automatically advanced in an otherwise unguided helical path the pitch of which is sufficient in and of itself to prevent the overlapping of adjacent turns of film, alternate ones of the several helix-forming devices going to make up such series being disposed with their axes in the same horizontal plane.

7. Apparatus for handling photographic film during processing comprising a concatenate series of unitary helix-forming devices on each of which, in response to rotation of the helix-forming device, the film is automatically advanced in an otherwise unguided helical path the pitch of which is sufficient in and of itself to prevent the overlapping of adjacent turns of film, the film-discharging end of each of the several helix-forming devices going to make up such series being in apposition to the film-receiving end of the succeeding helix-forming device.

8. Apparatus for handling photographic film during processing comprising a concatenate series of unitary helix-forming devices on each of which, in response to rotation of the helix-forming device, the film is automatically advanced in an otherwise unguided helical path the pitch of which is sufficient in and of itself to prevent the overlapping of adjacent turns of film, the film following a staggered course in progressing through the various helix-forming devices going to make up such series.

HAYDEN B. KLINE.